United States Patent
Kanno

(10) Patent No.: US 9,377,934 B2
(45) Date of Patent: Jun. 28, 2016

(54) IMAGE DISPLAY UNIT, IMAGE DISPLAY METHOD AND COMPUTER READABLE STORAGE MEDIUM THAT STORES IMAGE DISPLAY PROGRAM

(71) Applicant: CASIO COMPUTER CO., LTD., Shibuya-ku, Tokyo (JP)

(72) Inventor: Hiroki Kanno, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 332 days.

(21) Appl. No.: 13/777,738

(22) Filed: Feb. 26, 2013

(65) Prior Publication Data
US 2013/0222305 A1  Aug. 29, 2013

(30) Foreign Application Priority Data

Feb. 27, 2012  (JP) .................................. 2012-039903

(51) Int. Cl.
*G06F 3/0484* (2013.01)
*G06F 3/0485* (2013.01)
(Continued)

(52) U.S. Cl.
CPC ............ *G06F 3/0484* (2013.01); *G06F 3/0485* (2013.01); *G06F 3/04883* (2013.01); *H04N 1/00411* (2013.01); *H04N 1/00448* (2013.01); *H04N 1/00453* (2013.01); *H04N 1/00458* (2013.01); *H04N 1/00506* (2013.01); *H04N 1/32128* (2013.01)

(58) Field of Classification Search
CPC ............................. G06F 3/0484; G06F 3/0485
See application file for complete search history.

(56) References Cited

U.S. PATENT DOCUMENTS 7,437,005 B2 * 10/2008 Drucker ................ G06F 3/0483
382/205
7,668,400 B2 *  2/2010 Widdowson ........ G06F 3/04845
348/231.2

(Continued)

FOREIGN PATENT DOCUMENTS

JP        2006-067439 A      3/2006
JP        2006-076186 A      3/2006

(Continued)

OTHER PUBLICATIONS

Japanese Office Action dated Dec. 19, 2013 (and English translation thereof) in counterpart Japanese Application No. 2012-039903.

(Continued)

*Primary Examiner* — Amr Awad
*Assistant Examiner* — Stephen Bray
(74) *Attorney, Agent, or Firm* — Holtz, Holtz & Volek PC

(57) ABSTRACT

An image display unit includes an image display module changing for display images each having image and header information, a touch panel input module receiving inputs, an image reading module reading the image and header information of the images, a group definition determination module determining, based on the header information of a first image of the images that is displayed next in response to an operation performed on the touch panel input module, whether or not a group definition in the header information of the first image is the same as a first predetermined group definition, and an image changing module changing the images to the first image for display in a number of steps predetermined for the first predetermined group definition.

7 Claims, 13 Drawing Sheets

(51) Int. Cl.
*G06F 3/0488* (2013.01)
*H04N 1/00* (2006.01)
*H04N 1/32* (2006.01)

(56) References Cited

U.S. PATENT DOCUMENTS

| | | | |
|---|---|---|---|
| 2006/0044285 A1 | 3/2006 | Sato et al. | |
| 2006/0209344 A1* | 9/2006 | Ohmura | 358/1.15 |
| 2010/0169097 A1* | 7/2010 | Nachman et al. | 704/275 |
| 2010/0250112 A1* | 9/2010 | Ushida | G01C 21/3614 701/532 |
| 2010/0277496 A1 | 11/2010 | Kawanishi et al. | |
| 2011/0164126 A1* | 7/2011 | Ambor et al. | 348/65 |
| 2011/0317192 A1 | 12/2011 | Fukuoka et al. | |

FOREIGN PATENT DOCUMENTS

| | | |
|---|---|---|
| JP | 2006-157324 A | 6/2006 |
| JP | 2007-005985 A | 1/2007 |
| JP | 2008135994 A | 6/2008 |
| JP | 2009-009255 A | 1/2009 |
| JP | 2010-108070 A | 5/2010 |
| JP | 2010-198483 A | 9/2010 |
| JP | 2011-170603 A | 9/2011 |
| JP | 2012-006263 A | 1/2012 |
| JP | 2012037974 A | 2/2012 |
| JP | 2012-133732 A | 7/2012 |
| WO | WO 2010/032402 A1 | 3/2010 |
| WO | 2010087203 A1 | 8/2010 |

OTHER PUBLICATIONS

Chinese Office Action dated Dec. 25, 2014, issued in counterpart Chinese Application No. 201310113881.3.

* cited by examiner

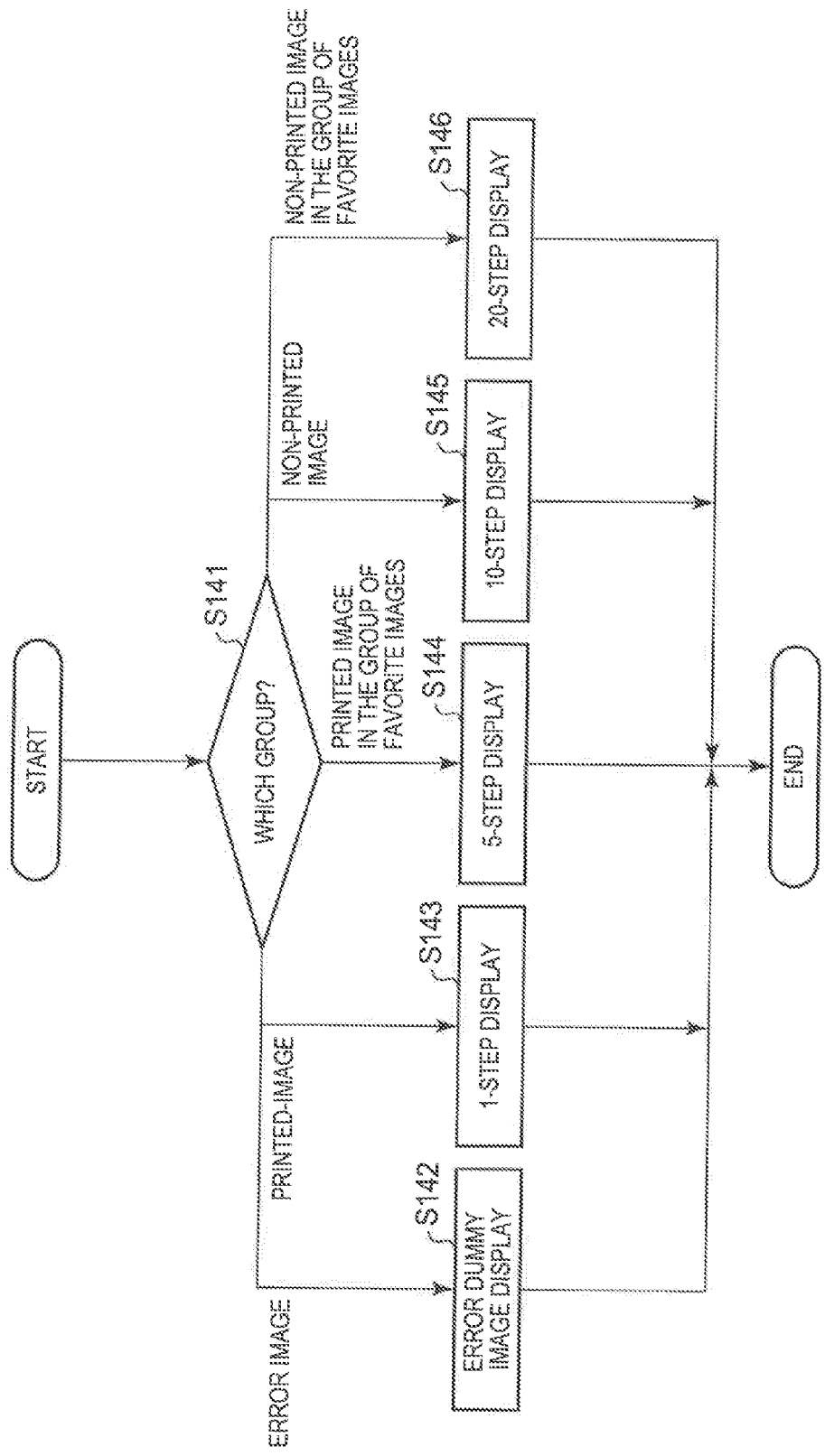

IMAGE DISPLAY UNIT, IMAGE DISPLAY METHOD AND COMPUTER READABLE STORAGE MEDIUM THAT STORES IMAGE DISPLAY PROGRAM

CROSS-REFERENCE TO RELATED APPLICATION

This application is based upon and claims the benefit of priority to the prior Japanese Patent Application No. 2012-39903 filed on Feb. 27, 2012, the entire contents, including the description, claims, drawings and abstract, of which are incorporated herein by reference.

BACKGROUND OF THE INVENTION

1. Field of the Invention

The present invention relates to an image display unit, an image display method and a storage medium that stores an image display program.

2. Description of the Related Art

In recent years, small printers for domestic use have been propagated widely which can print names and addresses of addressees, statements and images such as pictures on post cards. By using these small printers, it has now become possible to print domestically names and addresses of addressees, statements and images such as pictures on new year's post cards or post cards sent to friends or the like to offer best wishes for their health in a hot season In those small printers, there are some which have a function to edit a number of images captured from a portable storage medium such as a memory card without involvement of a personal computer.

With the printer having the edit function, it is possible to easily print, for example, pictures captured by a digital still camera (DSC) on post cards or the like directly from this printer without involvement of a personal computer, and therefore, the printer is very useful to those who have no personal computer. In addition, in the event that image data stored within the DSC or image data of an external storage medium is once stored in the printer, desired image data is selected to be printed, and therefore, the printer is also useful in this respect.

In addition, for example, Japanese Unexamined Patent Publication No. 2006-76186 (Patent Literature 1) discloses a printer which can make the previous printing information effective in printing image data, the printer holding printing dates as management information so as to distinguish printed images from others so that the user can select easily desired images for printing.

In the printer described in Patent Literature 1, however, in selecting images, in the event that images are grouped as a group of favorite images and a group of printed images and images are displayed one by one for selection in each group, the user can select a desired image more easily than retrieving it from all the images. However, when the user wants to print the images which are held individually in the group of favorite images, the group of printed images and a group of non-printed images, the user is required to go through the respective selection screens of the groups, and therefore, the number of times of transition of screens is increased.

BRIEF SUMMARY OF THE INVENTION

The invention has been made in view of these situations and an object thereof is to solve the problem inherent in the related art.

According to a first aspect of the invention, there is provided an image display unit including an image display module configured to switch an image displayed among a plurality of images each having image information and header information, a touch panel input module having an input area which receives inputs, an image reading module configured to read the image information and the header information of each of the plurality of images, a group definition determination module configured to determine, based on the header information of a first image among the plurality of images which is to be displayed next in response to an operation performed on the touch panel input module, whether or not a group definition included in the header information of the first image is the same as a first predetermined group definition, and an image changing module configured to switch to the first image for display with a step of number predetermined for the first predetermined group definition when it is determined by the group definition determination module that the group definition of the first image is the same as the first predetermined group definition.

According to a second aspect of the invention, there is provided an image display method configured to execute an image display process of changing for display a plurality of images each having image information and header information, an image reading process of reading the image information and the header information of the plurality of images, a group definition determination process of determining, based on the header information of a first image of the plurality of images that is displayed next in response to an operation performed on a touch panel input module having an input area which receives inputs, whether or not a group definition included in the header information of the first image is the same as a first predetermined group definition, and an image changing process of, when it is determined through the group definition determination process that the group definition of the first image is the same as the first predetermined group definition, changing the images to the first image for display in a number of steps predetermined for the first predetermined group definition.

According to a third aspect of the invention, there is provided a computer readable storage medium which stores an image display program for causing a computer to realize an image display method in an image display unit including an image display module configured to change for display a plurality of images each having image information and header information and a touch panel input module having an input area which receives inputs, the computer readable storage medium which stores the image display program being configured to cause the computer to execute an image display process of changing for display a plurality of images each having image information and header information, an image reading process of reading the image information and the header information of the plurality of images, a group definition determination process of determining, based on the header information of a first image of the plurality of images that is displayed next in response to an operation performed on a touch panel input module, whether or not a group definition included in the header information of the first image is the same as a first predetermined group definition, and an image changing process of, when it is determined through the group definition determination process that the group definition of the first image is the same as the first predetermined group definition, changing the images to the first image for display in a number of steps predetermined for the first predetermined group definition.

BRIEF DESCRIPTION OF THE SEVERAL VIEWS OF THE DRAWINGS

FIGS. 5A, 5B, 5C and 5D show diagrams depicting a process according to the embodiment of the invention of reading all images that are stored in a card medium or the like and determining which group definitions the individual images read correspond to.

FIG. 13 is a flowchart in relation to a quick change of screen in scrolling images on the image display unit having a touch panel according to the embodiment of the invention.

DETAILED DESCRIPTION OF THE INVENTION

Figure 1:
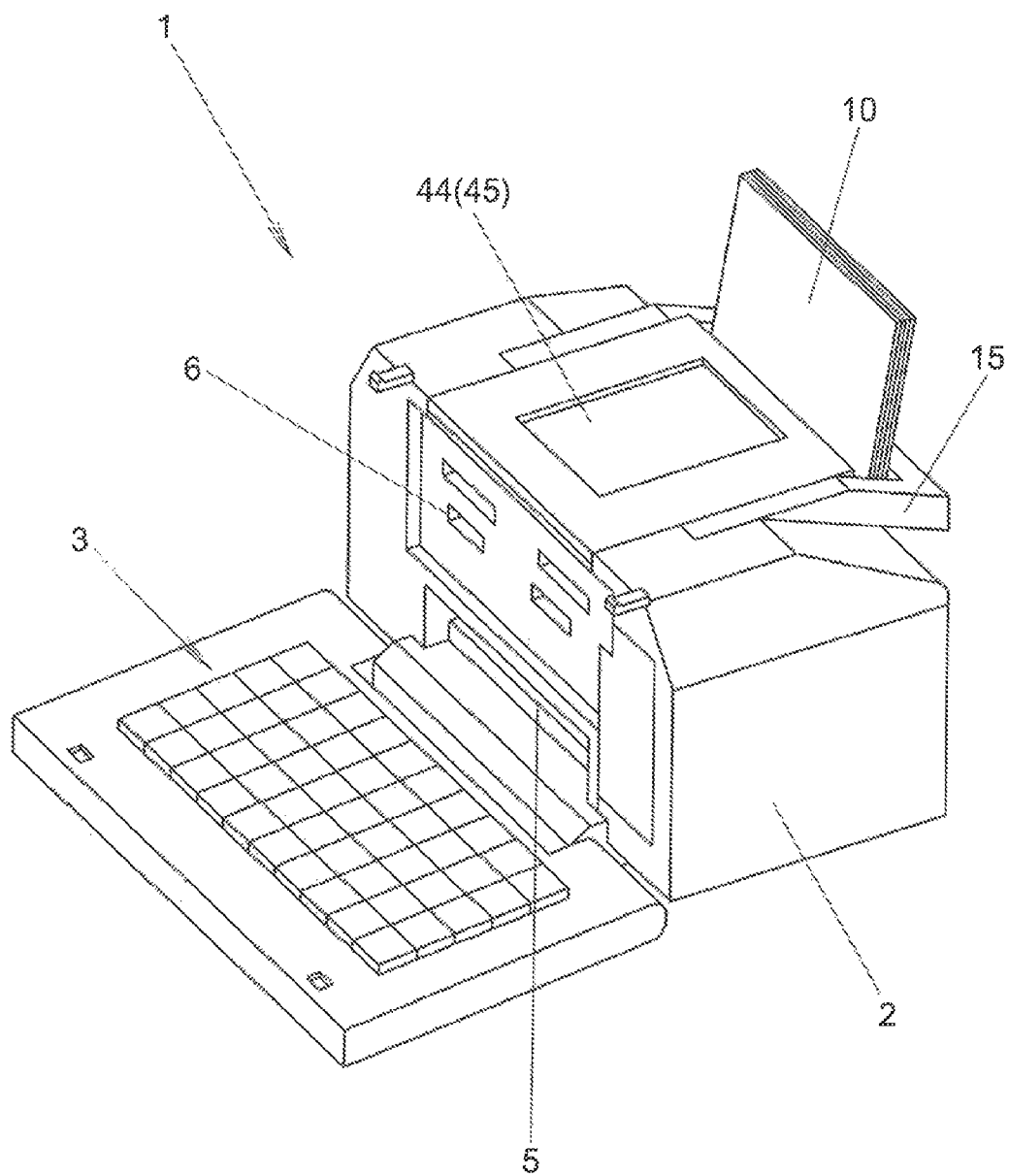
FIG. 1 is a perspective view of an image display unit according to an embodiment of the invention.
Figure 2:
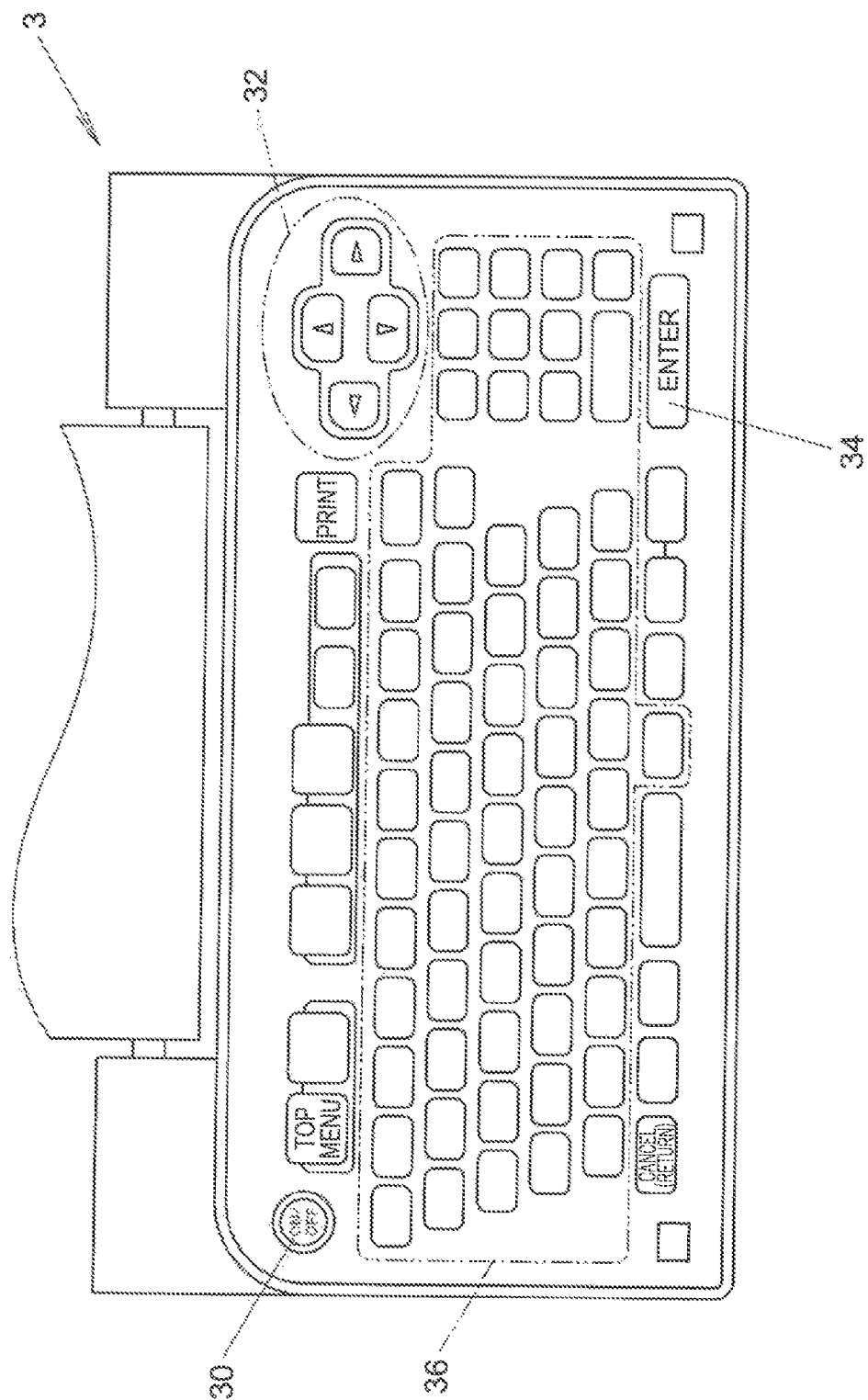
FIG. 2 is an explanatory diagram depicting a keyboard of the image display unit according to the embodiment of the invention.
Figure 3:
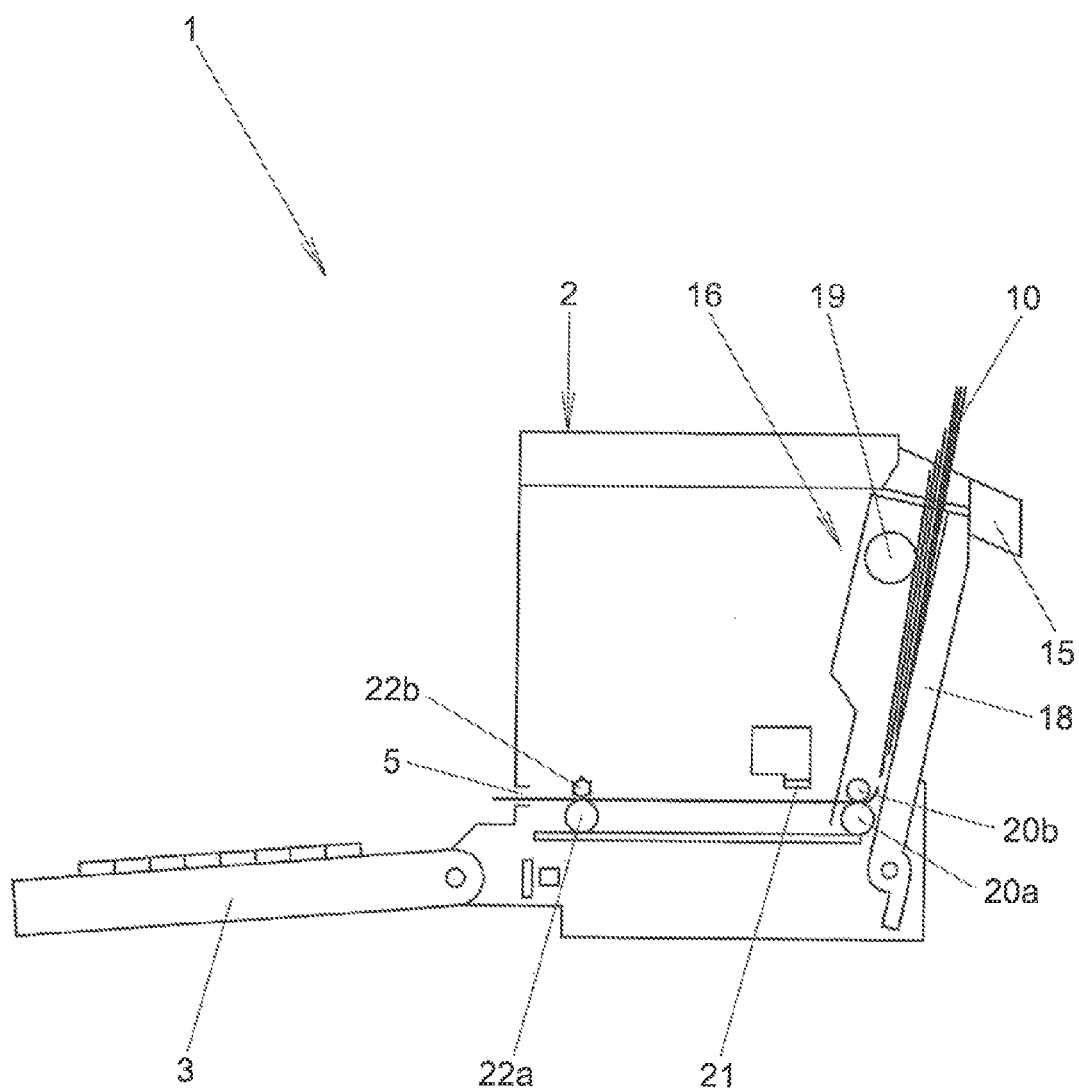
FIG. 3 is an exemplary sectional view of the image display unit according to the embodiment of the invention.

Hereinafter, an embodiment of the invention will be described in detail by reference to the drawings. The present invention relates to an image display unit 1 which is a display unit capable of printing selectively an image on a post card or the like, for example. FIG. 1 is a perspective view depicting an external appearance of the image display unit 1 according to an embodiment of the invention. FIG. 2 is an explanatory diagram depicting a keyboard 3 of the image display unit 1, and FIG. 3 is an exemplary side sectional view of the image display unit 1. It should be noted that hatching is excluded in FIG. 3 for the sake of easy understanding of the diagram.

The image display unit 1 is a printing unit which can print an image or the like on relatively small-size printer paper 10 such as a post card (100×148 mm), L-size paper (89×127 mm) or 2L-size paper (178×127 mm) The image display unit 1 includes a function to print a photographic image captured by a digital camera or a scanned image on a post card and also has various functions such as a function to prepare a list of addresses, a function to automatically print addresses on post cards from the list of addresses, a function to capture a photographic image or images and print them as pictures, a function to edit a sentence or sentences, and a function to print a combination of a captured image and a sentence on a post card.

Additionally, in setting a layout of a post card or the like in a printing mode, the image display unit 1 of the invention classifies images such as pictures or illustrations to be printed on a rear side of a post into groups so as to enable a quick selection of a desired image.

As shown in FIG. 1, this image display unit 1 includes a box-shaped case 2, and a keyboard 3, which functions as an input module, is disposed at the front of the case 2. The keyboard 3 is mounted rotatably near a front lower end of the case 2. Then, when in use, the keyboard 3 falls flat in front of the case 2 as shown in the figure, while when not in use, the keyboard 3 is retracted to stand facing oppositely a front surface of the case.

As shown in FIG. 2, disposed on this keyboard 3 are a power supply switch key 30 configured to turn on or off a power supply to the image display unit 1, cursor keys 32 configured to select an item and change the contents of a setting for the selected item, an enter key 34 configured to determine on a selection of a target or a change made to the contents to advance an operation, a top menu key configured to display a top menu screen on a touch panel display module 44, a print key used to instruct the execution of printing, and character and numeric keys 36 used to enter characters and numbers. The individual keys function as input modules to transmit a predetermined operation signal to a control unit 41, which will be described later, based on input operations performed by a user.

As shown in FIG. 1, a sheet discharge opening 5 and a storage medium insertion slot 6 are formed in the front surface of the case 2. Print paper 10 such as a post card on which required printing is completed or a printed picture is discharged from the sheet discharge opening 5, and a portable storage medium such as a memory card can be inserted into the storage medium insertion slot 6. By inserting a detachable portable storage medium such as a memory card into this storage medium insertion slot 6, image data of pictures which are captured by a digital camera, edit data of sentences which are edited by a personal computer and/or addressee data of a list of addresses made up of data of a plurality of addressees can be captured into the image display unit 1, and data which is edited by the image display unit 1 can be saved in the memory card inserted.

In addition, a touch panel is disposed on a top surface of the case 2. In this touch panel, a touch panel input module 45 is provided on a surface of the touch panel display module 44 which is a liquid crystal display or the like. The touch panel can be turned to a top surface side of the case 2. Various data needed in the image display unit 1 is displayed on the touch panel display module 44. Specifically, input details corresponding to input signals from the keyboard 3 are displayed on a screen of the touch panel display module 44. Alternatively, a menu screen necessary for various settings is displayed on the touch panel display module 44. Additionally, a photographic image captured from a digital camera or an image of an illustration to be used for a new year's post card or a Xmas card is also displayed on the touch panel display module 44.

The touch panel input module 45 has an input area which can receive inputs made by the user by touching the input area with his or her finger or fingers, whereby a simple input operation is enabled by using the touch panel without using the keyboard 3.

Further, a handle 15 is attached to an upper portion of the case 2 so as to be rotated from a rear side of the case 2 to a position above the case 2. This handle 15 has a substantially U-shape and is gripped on when carrying the image display unit 1.

As shown in FIG. 3, this image display unit 1 has a hollow space portion 16 which is opened to a rear surface of the case 2, and a sheet feeding tray 18 is disposed so as to close an opening of the hollow space portion 16. This sheet feeding tray 18 is pivotally attached to the case 2 in a position lying near a lower portion at the rear of the case 2. The sheet feeding tray 18 can be rotated in such a way as to move back and forth at an upper end thereof, so that the sheet feeding tray 18 can hold a stack of sheets of print paper 10.

A pickup roller 19 is disposed in an upper position inside the sheet feeding tray 18 for feeding out sheets of print paper 10 held in the sheet feeding tray 18 sheet by sheet. Additionally, carrier rollers 20a, 20b are disposed near a lower end of the sheet feeding tray 18 for carrying the print paper 10 which is fed out downwards by the pickup roller 19 in the direction of the sheet discharge opening 5 in the case 2. Further, a print head 21, which is a printing mechanism, is disposed near and ahead of the carrier rollers 20a, 20b in an interior of the case 2. Additionally, sheet discharging rollers 22a, 22b are disposed ahead of the print head 21 in the interior of the case 2 for discharging the print paper 10 on which a required printing is completed from the sheet discharging opening 5. The carrier roller 20a and the sheet discharging roller 22a are controlled to rotate to carry the print paper 10 at a predetermined speed by stepping motors, not shown in the drawing. It should be noted that the pickup roller 19, the carrier rollers 20a, 20b and the sheet discharging rollers 22a, 22b function as a carrier mechanism in the image display unit 1.

The print head 21, which is the printing mechanism, is an inkjet-type print head 21 which has nozzles from which yellow (Y), cyan (C), and magenta (M) inks are discharged individually, whereby the inks of Y, C and M colors are jetted from the respective nozzles onto a sheet of print paper 10 to execute printing. Although the inkjet-type print head 21 is described here, the invention is not limited to the inkjet process.

Then, sheets of print paper 10 held in the sheet feeding tray 18 are fed out downwards sequentially from a frontmost sheet of print paper 10 in the stack of sheets of print paper 10 by the pickup roller 19, and each sheet of print paper 10 is fed out to a position directly below the print head 21 while being held between the carrier rollers 20a, 20b. Then, after required printing is completed, the sheet of print paper 10 is held between the sheet discharging rollers 22a, 22b to thereby be discharged to the outside of the image display unit 1 from the sheet discharging opening 5.

Figure 4:
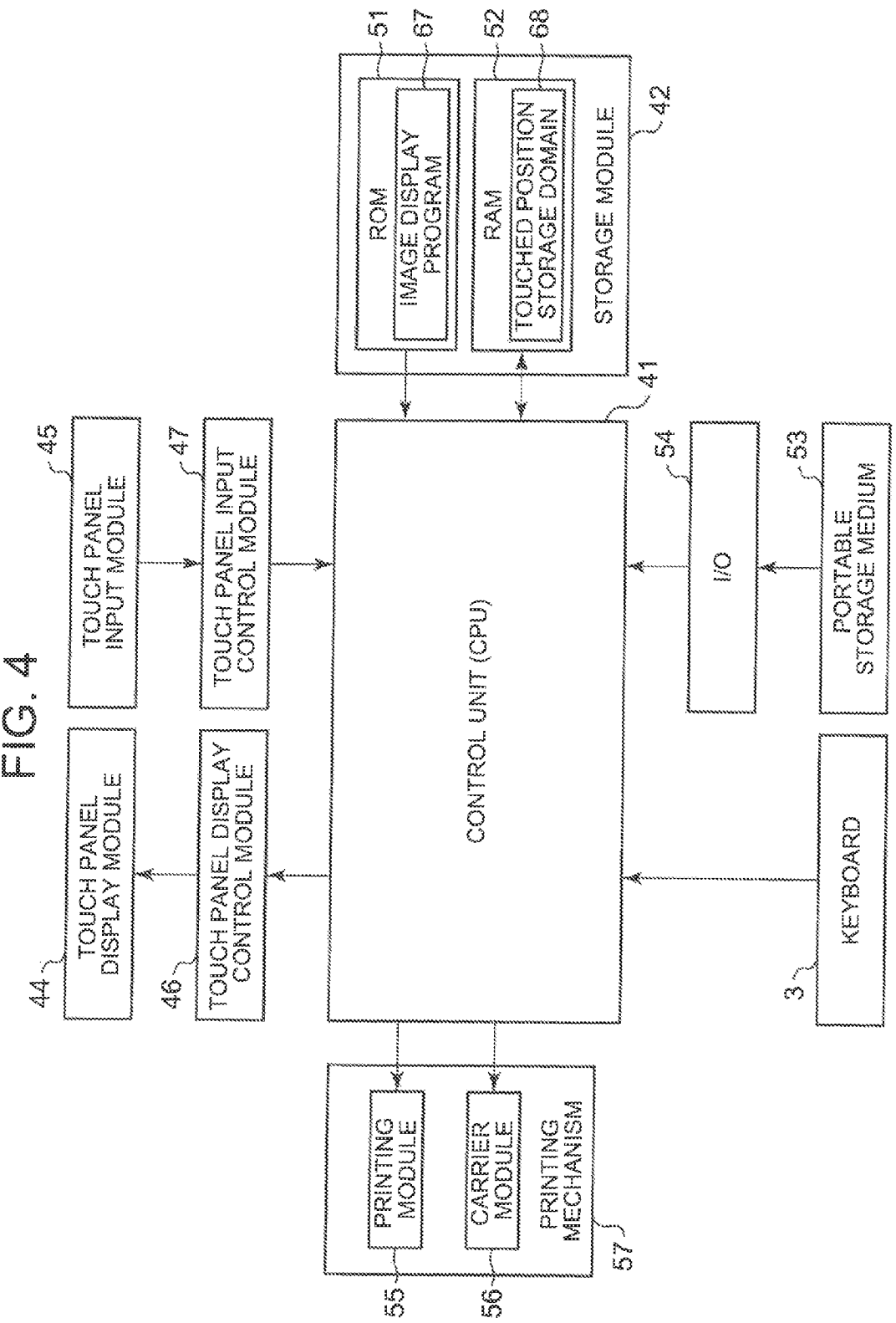
FIG. 4 is a functional block diagram of the image display unit according to the embodiment of the invention.

Next, a control circuit of the image display unit 1 of the embodiment will be described. FIG. 4 is a functional block diagram of the image display unit 1. As shown in FIG. 4, this image display unit 1 includes the control unit 41 which governs the whole system, a storage module 42 made up of a ROM 51, a RAM 52, a detachable portable storage medium 53 such as a memory card which is connected via an I/O 54, the touch panel display module 44, a touch panel display control module 46 which is a display screen changing module which controls the touch panel display module 44, the touch panel input module 45 and the keyboard 3 which constitute an input module, a touch panel input control module 47 which controls the touch panel input module 45, a printing mechanism 57, and a voice guidance module such as a loud speaker, not shown.

The input module has the keyboard 3 which is used by a user when the user performs an input operation, and the keyboard 3 has the power supply switch key 30, the cursor keys 32, the enter key 34, the print key and so forth. Further, as the input module, the touch panel input control module 47 is provided, and the touch panel input control module 47 controls the touch panel input module 45. Then, the control unit 41 can detect multiple touches as operations on the touch panel and enables the change of screens and settings by, for example, a flick operation, a swipe operation, a tap operation, a touch operation and the like which are operations to be performed by a plurality of fingers of the user.

The touch panel display module 44 is a panel on which various operation screens are displayed and is controlled by the control unit 41 which receives a predetermined operation signal to enable a predetermined operation screen to be displayed thereon via the touch panel display control module 46 which controls the touch panel display module 44.

The control unit 41 is a CPU and activates a program stored in advance in the ROM 51 or a program stored in the memory card in response to a key-entered operation signal from the input module or automatically, controlling the respective modules of the control circuit using the RAM 52 as a working memory.

A character font which is used in editing a sentence, a print font, information on standards of print papers to be edited and control programs used when the control unit 41 controls the respective modules are stored in advance in the ROM 51.

In addition, an image display program 67 is stored in the ROM 51, and this image display program 67 enables a quick selection of an image such as a picture or an illustration to be printed on a rear surface of a post card in setting a layout of the post card or the like in a printing mode.

Additionally, data of an original image such as a photographic image captured by a digital camera or a scanned image can be stored in the read/write ROM 51 which is made up of a flash memory by copying the data from the memory card via the control unit 41.

The RAM 52 is a working memory which stores information on the editing of a document such as characters inputted at the input module, display data to be displayed at the touch panel display module 44, information on an image which is under image processing, variables to be used in arithmetic operation and registers. Additionally, data of a photographic image captured by a digital camera or a scanned image is stored in the memory card.

Further, the RAM 52 has a touched position storage domain 68 which stores sequentially information on a touched position at the touch panel input module 45.

In addition, the detachable portable storage medium 53 such as a memory card, which is an external memory, is allowed to be connected to the control unit 41 via the I/O 54 by being inserted into the storage medium insertion slot 6.

The printing mechanism 57 includes a printing module 55 and a carrier module 56. The printing module 55 is made up of the print head 21 described above and executes a process of printing data on the print paper 10. In addition, the carrier module 56 is made up of the pickup roller 19 which is described above, the carrier rollers 20a, 20b, the sheet discharging rollers 22a, 22b and stepping motors which rotate those rollers and executes a process of carrying the print paper 10. The voice guidance module outputs an error sound and voice messages such voice guidance for operations to be performed.

In the image display unit 1 of the embodiment, in particular, in setting a layout of printing that is executed on a rear surface of a post card, the user needs to operate the image display unit 1 so as to enable the selection of a picture, an illustration and/or a sentence example from selection images. Then, the invention proposes how to select a predetermined image in an efficient and speedy fashion. Thus, various operations will be described which are performed on the touch panel display module 44 in realizing the invention.

Hereinafter, image selection using the touch panel input module 45 will be described in the image display unit 1 of the embodiment. The image display unit 1 is made to detect an input operation performed by the user with his or her finger or fingers by way of the touch panel input module 45.

The touch panel input control module 47 detects and determines an input operation performed by the user with his or her finger or fingers on the touch panel input module 45 and outputs a signal corresponding to the input operation so detected and determined to the control unit 41. Operations that are performed by the user with his or her finger or fingers and which are detected at the touch panel input module 45 by the touch panel input control module 47 include a "touch operation" and a "release operation." In addition to these independent operations, there are some operations which result from a combination of the touch operation and the release operation. They are a "swipe operation", a "flick operation," and a "tap operation."

The "touch operation" is an operation which is detected by the touch panel input control module 47 when the finger of the user is brought into touch with an operation screen of the touch panel input module 45.

The "release operation" is an operation which is detected by the touch panel input control module 47 when the finger which is in touch with the operation screen as a result of the touch operation is moved away from the operation screen.

The "swipe operation" is an operation which is detected by the touch panel input control module 47 when the release operation is performed after a touched position, which is a position on the operation screen of the touch panel input module 45 touched by the finger of the user, is shifted in such a way as to trace something with the finger kept in touch with the operation screen after the touch operation is performed and after an elapse of a first predetermined period of time (for example, one second) which is set in advance.

The "flick operation" is an operation which is detected by the touch panel input control module 47 when the release operation is performed after the touched position is shifted in such a way as to flick out something with the finger kept in touch with the operation screen after the touch operation is performed and before the elapse of the first predetermined period of time.

The "tap operation" is an operation which is detected by the touch panel input control module 47 when the operation screen of the touch panel input module 45 is tapped once or a plurality of times by the finger of the user in such a way as to strike the finger lightly against the operation screen. Namely, the "tap operation" is an operation which is detected by the touch panel input control module 47 when the release operation is performed without shifting the touched position after the touch operation is performed and before an elapse of a second predetermined period of time (for example, 0.5 second) which is set shorter than the first predetermined time.

Next, image display states of the touch panel display module 44 which is controlled by the control unit 41 will be described hereinafter. When the user performs the various operations in the image display unit 1, images are displayed on the touch panel display module 44.

In selecting an image such as a picture or an illustration, when the touch panel input control module 47 detects that the "swipe operation" is performed, the control unit 41 executes screen scrolling by causing the touch panel display module 44 to shift the screen to the next image or the previous image based on a direction in which the swipe operation is performed at a speed matching a speed at which the swipe operation is performed.

In selecting an image such as a picture or an illustration, when the "flick operation" is performed, as with the "swipe operation," the control unit 41 causes the touch panel display module 44 to display the next image or the previous image thereon based on the direction in which the flick operation is performed and executes screen scrolling.

In addition, when the "tap operation" is performed, the control unit 41 sets, for example, the number of prints to be made based on the number of times of tapping and produces a display state in which the number of prints so set is displayed together with a selected image. For example, when a "double tapping" operation which indicates that tapping is made twice is executed, the control unit 41 causes characters reading "two prints" to be displayed in the selected image on the screen, indicating to make two prints of the selected image.

In the image display unit 1 of the invention, when an image is attempted to be printed on a post card, a plurality of images are read from the external memory or the detachable and portable storage medium 53 via the I/O 54 which is the image reading module which reads images through the aforesaid storage medium inserting slot 6, and the images so read are classified into groups. Then, in selecting an image therefrom, the speed at which the screen is scrolled is changed according to the groups into which the images are classified, so that a target image can be selected quickly from the images read for printing after setting the number of prints to be made.

Here, data of an image displayed by the image display unit 1 has image information which contains color information on each dot of the image and header information which contains the group definition of the image. There are group definitions which define individually a group of favorite images, a group of non-printed images, a group of printed images, a group of non-reproduced images and a group of error images. Favorite images are images which are particularly well liked by the user, non-printed images are images that have not yet been printed, printed images are images that have been printed at least once, non-reproduced images are images that have not yet been displayed by the image display unit, and error images are images whose picture size and picture aspect ratio are not proper. In addition, although they will be described later, a first predetermined group definition and a second predetermined group definition are any of these group definitions.

Specifically speaking, the control unit 41 functions as a group definition determination module which determines, based on header information of an image (a first image) of the plurality of images obtained via the I/O 54 which is to be displayed next in response to the operation performed on the touch panel input module 45, whether or not the group definition contained in the head information of the image is the same as the predetermined group definition (the first predetermined group definition).

Figure 5A:
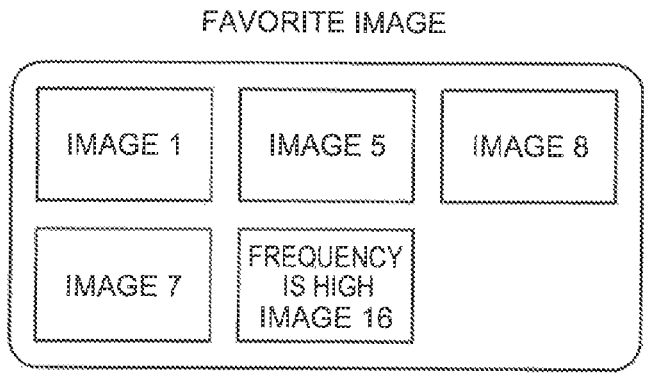
Figure 5B:
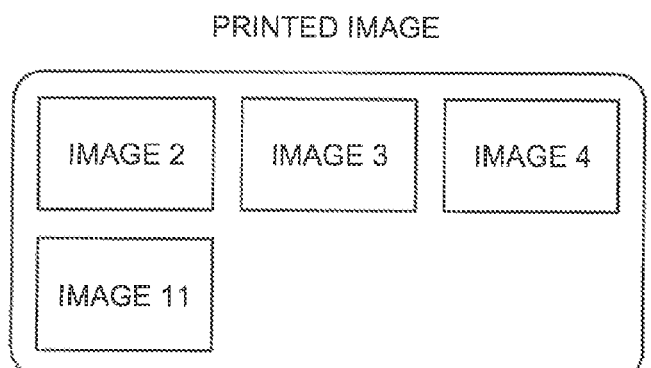
Figure 5C:
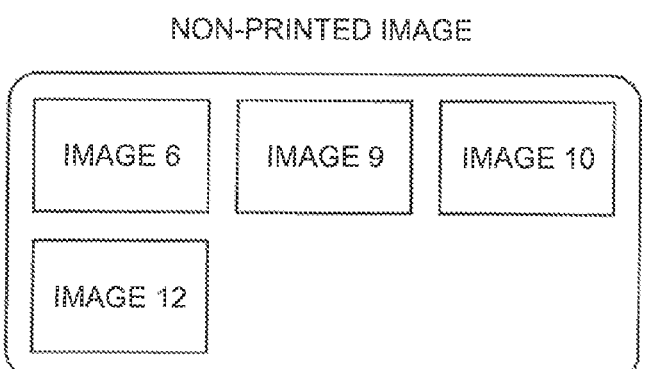
Figure 5D:
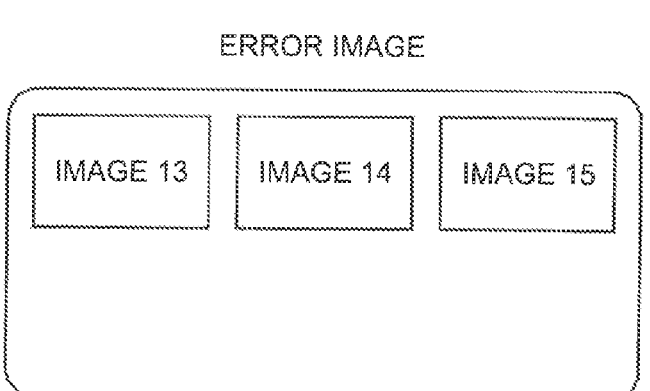

Functioning as the group definition determination module, the control unit 41 determines which groups images of image information which are obtained via the I/O 54 are defined to fall under, for example, the group of favorite images of non-printed images and printed images as shown in FIG. 5A, the group of printed images as shown in FIG. 5B, the group of non-printed images as shown in FIG. 5C and the group of error images as shown in FIG. 5D. As this occurs, the control unit 41 analyzes the header information of the image data and determines the groups under which the images are defined to fall from the printing history, the favorite setting history and the like of the images. Additionally, the control unit 41 can display the images by group as required.

Additionally, the control unit 41 functions as a group definition setting module to set images of picture sizes and picture aspect ratios which are unsuitable to be read into the error images.

When functioning as the group definition setting module, the control unit 41 may set automatically images which have been printed highly frequently and images which are periodically used in relation to annual events to favorite images. By dosing so, images which have been printed highly frequently can be registered automatically as favorite images without the user having to view images for registration as favorite images.

In addition, the control unit 41 controls the touch panel display control module 46 so as to display a table of images obtained via the I/O 54 which are arranged in the order of preparation dates of image data or in the order of capturing image data over all the groups, allowing a thumbnail of images to be displayed on the touch panel display module 44. Then, as shown in FIGS. 6B, 6C, the screen displaying the thumbnail of images can be changed to a one image display in which only an image 1 is displayed.

Then, the control unit 41 functions as a touched state detection module which detects whether or not the touch panel input module 45 is being touched by the user for touch input by controlling the touch panel input control module 47.

When detecting, as the touched state detection module, that the touch panel input module 45 is touched by the user, the control unit 41 then functions as a touched position acquiring module to detect and acquire a position on the touch panel input module 45 where the touch panel input module 45 is actually touched by the user. By doing so, the control unit 41 can detect whether or not the touched state is held continuously based on information on touched position which is sequentially stored in the touched position storage domain 68 of the RAM 52.

Figure 6B:
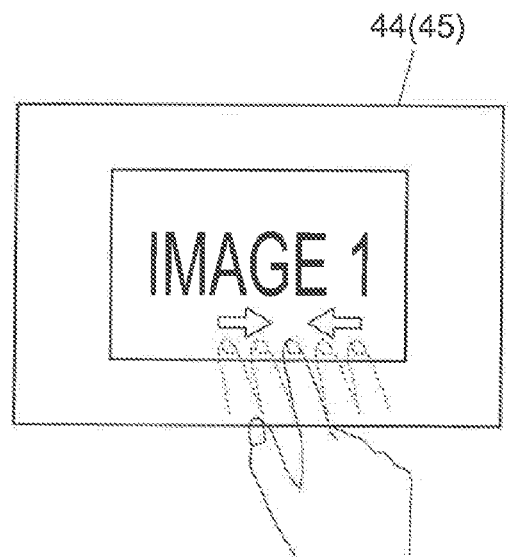
FIGS. 6A, 6B and 6C show diagram depicting a process according to the embodiment of the invention of changing a display screen from a thumbnail display to one image display and scrolling the screen or operating to set printing on the screen.
Figure 6A:
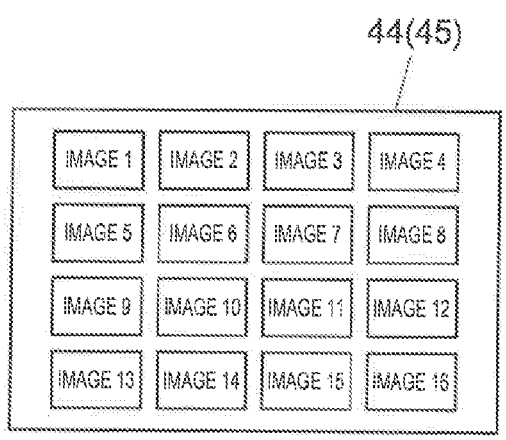
Figure 6C:
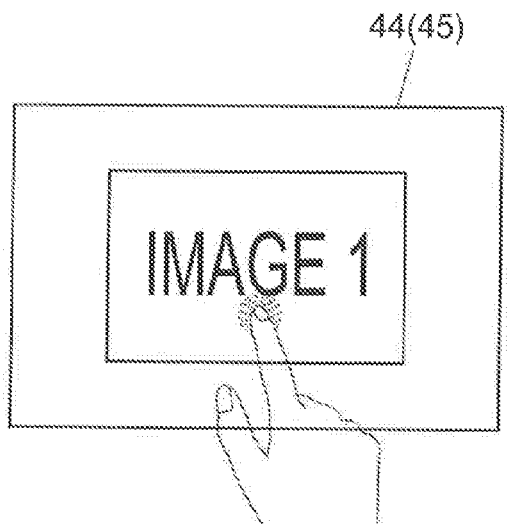
Figure 7A:
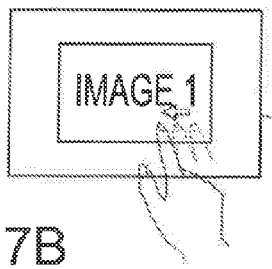
FIGS. 7A, 7B, 7C, 7D, 7E, 7F, 7G, 7H, 7I, 7J and 7K show diagrams depicting a 10-step display change according to the embodiment of the invention which is adopted when an image of a group defined as a group of favorite images is scrolled.
Figure 7B:
Figure 7C:
Figure 7D:
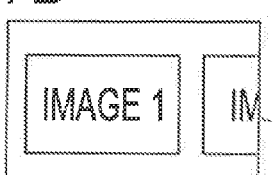
Figure 7E:
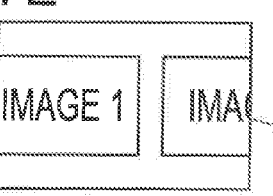
Figure 7F:
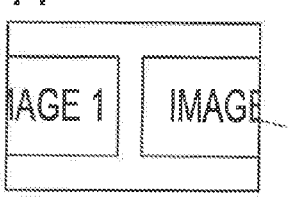
Figure 7G:
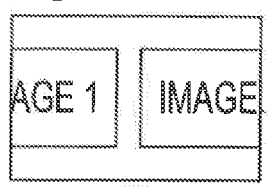
Figure 7H:
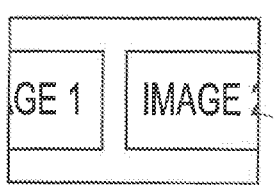
Figure 7I:
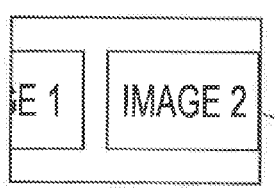
Figure 7J:
Figure 7K:
Figure 8A:
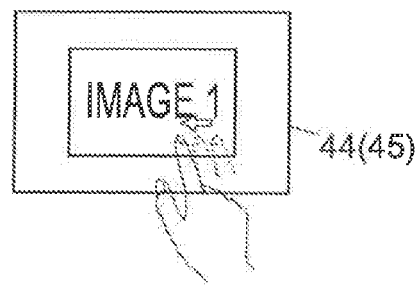
FIGS. 8A, 8B, 8C, 8D, 8E and 8F shows diagrams depicting a 5-step display change according to the embodiment of the invention which is adopted when an image of a group defined as a group of non-printed images is scrolled.
Figure 8B:
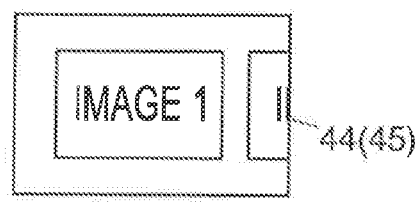
Figure 8C:
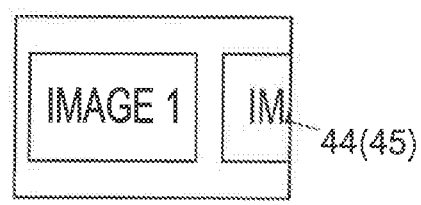
Figure 8D:
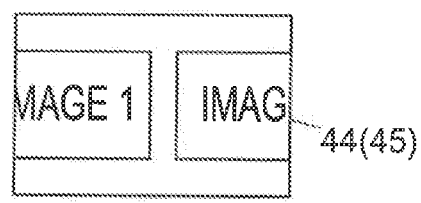
Figure 8E:
Figure 8F:
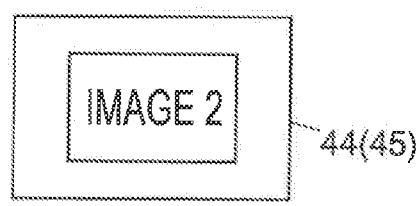

When detecting and acquiring, as the touched position acquiring module, continuously the position of an operating member on the touch panel input module 45 as shown in FIGS. 6B and 6C, the control unit 41 then functions as a flick detection module which detects, based on the information on touched position which is stored sequentially in the touched position storage domain 68 of the RAM 52, whether or not a flick operation is being performed on the touch panel input module 45 in which the touched state continues.

Further, the control unit 41 functions as a speed calculation module to calculate an average flick speed based on the information on touched position which is sequentially stored in the touched position storage domain 68 of the RAM 52 and detection timing.

Additionally, the control unit 42 functions as a direction determination module which determines the direction in which a flick operation is performed based on the information on touched position which is sequentially stored in the touched position storage domain 68 of the RAM 52.

In addition, when the group definition determination module determines that the group definition of an image (a first image) which is to be displayed next in response to the operation performed on the touch panel input module 45 is the same as the predetermined group definition (the first predetermined group definition), the control unit 41 functions as an image changing module which changes the display to the image to be displayed next in a number of steps which is predetermined for the group definition.

Specifically, functioning as a step changing module, the control unit 41 sets the number of display steps in changing a non-printed image of non-printed images which are defined to fall under the group of favorite images to a non-printed image of the non-printed images which precedes or succeeds the non-printed image to 20 steps. This means on the assumption that one step takes 0.1 second that it takes two seconds to scroll the displayed image to the next image when the flick operation is performed during image selection.

Further, functioning as the step changing module, the control unit 41 sets the number of display steps in changing images of the group of non-printed images to 10 steps. This means on the assumption that one step takes 0.1 second that it takes one second to scroll the displayed image to the next image when a flick operation is performed during image selection as shown in FIG. 7.

Additionally, functioning as the step changing module, the control unit 41 sets the number of display steps in changing printed images which are defined to fall under the group of favorite images to five steps. This means on the assumption that one step takes 0.1 second that it takes 0.5 second to scroll the displayed image to the next image when a flick operation is performed during image selection as shown in FIG. 8.

Figure 9A:
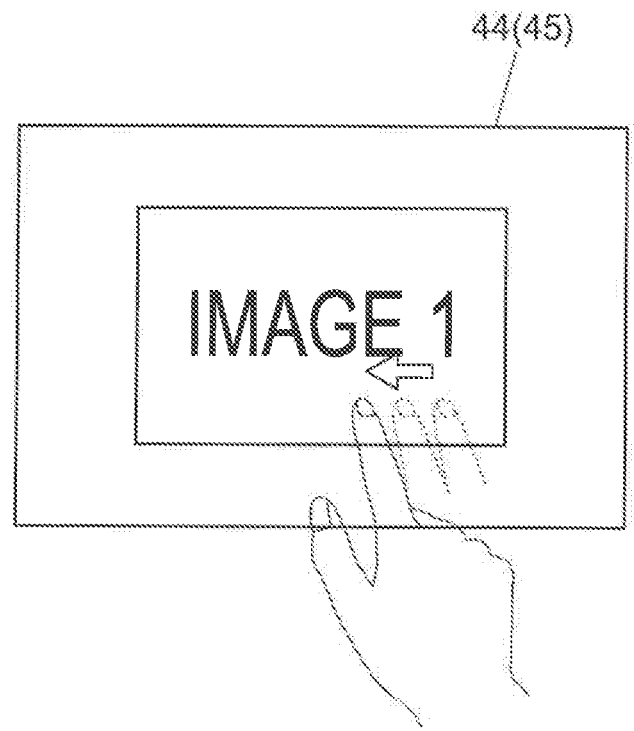
FIGS. 9A and 9B shows diagrams depicting a 1-step display change according to the embodiment of the invention which is adopted when an image of a group defined as a group of printed images is scrolled.
Figure 9B:
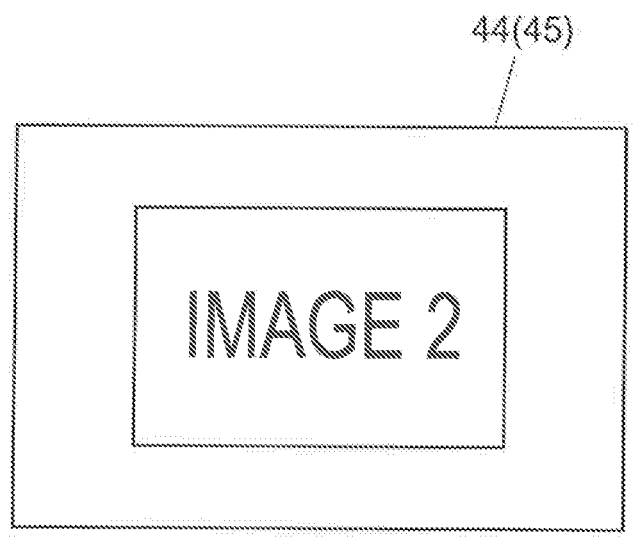
Figure 10:
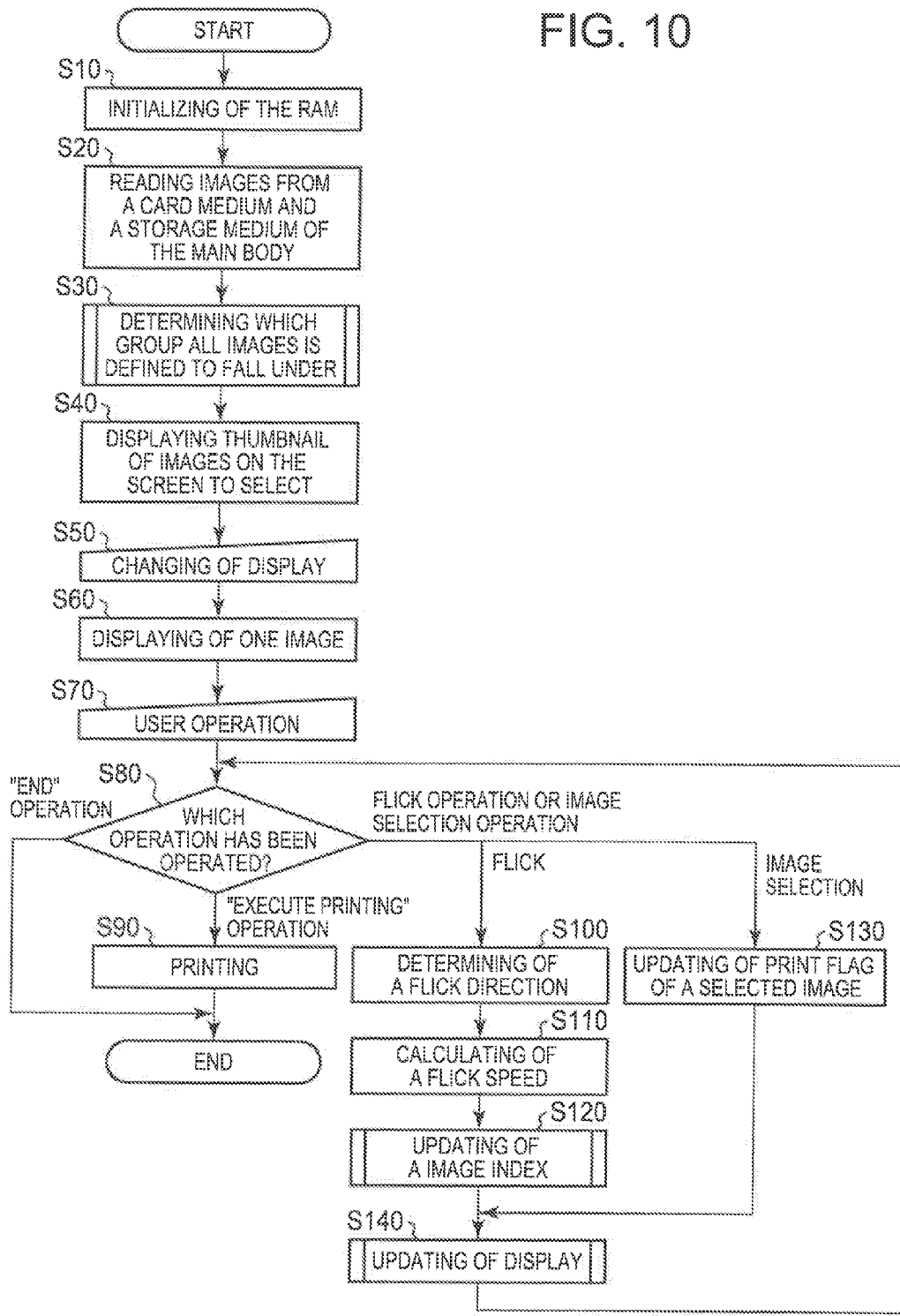
FIG. 10 is a flowchart in relation to an image scroll performed on the image display unit having a touch panel according to the embodiment of the invention.

Further, functioning as the step changing module, the control unit 41 sets the number of display steps, in the group definition changing images of the group of printed images, to one step. This means on the assumption that one step takes 0.1 second that it takes 0.1 second to quickly scroll the displayed image to the next image when a flick operation is performed during image selection as shown in FIG. 9.

Additionally, functioning as the step changing module, the control unit 41 sets the number of display steps, in the group definition changing images of the group of error images which cannot be reproduced, to one step. This means on the assumption that one step takes 0.1 second that it takes 0.1 second to quickly scroll the displayed image to, for example, a screen displaying a dummy image of "?" or a screen displaying a message reading "reproduction is impossible" in place of the image that cannot be reproduced.

When comparing a flick speed obtained by a speed calculation module with a predetermined speed threshold finds out that the flick speed is faster than the speed threshold and the group definition determination module determines that the group definition of an image (a first image) to be displayed next is the same as the predetermined group definition (the second predetermined group definition), the control unit 41 functions as a skip changing module which changes images for display by skipping the image whose group definition is determined to fall under the printed image by the group definition determination module.

Additionally, when an image of the group of non-printed images is printed, the control unit 41 functions as the group definition setting module to set the image printed into the group of printed images.

When an image is selected to be printed by the user after the repetition of screen scrolling, the touch panel input module 45 functions as a print selecting module which sets the number of prints to be made through a touching operation performed on the image displayed.

Next, the flow of a series of image grouping and screen scrolling operations will be described in detail using flowcharts which is executed to select a desired image from a number of images such as pictures or illustrations which are stored in advance to print a photographic image or the like on a rear surface of a post card in the image display unit 1. FIGS. 10 to 13 show flowcharts illustrating the flow of a series of image grouping and screen scrolling operations using a touch panel which can detect multiple touches.

Firstly, when the user sets the image display unit 1 to an image reading and printing mode, the control unit 41 executes an initializing process (step S10) in which the RAM 52 is initialized and a message displaying "under initialization" is displayed on the touch panel display module 44.

When the initialization process (step S10) is completed, the control unit 41 executes an image reading process (step S20) in which image information on all the images is read from the card medium via the I/O 54 and image information on all the images stored in the storage medium of the main body.

When the image information on all the images has been read, the control unit 41 executes a group definition determination process (step S30) in which as shown previously in FIG. 5, all the images from the image 1 to the image 16 are individually determined which of the group of favorite images, the group of non-printed images, the group of printed images and the group of non-reproduced images which are processed the same as the printed images they are defined to fall under. This group definition determination process (step S30) will be described in detail later by using a sub-routine flow chart shown in FIG. 11.

Following this, the control unit 41 executes a thumbnail display process (step S40) in which as shown previously in FIG. 6A, the thumbnail of images is displayed on the touch panel display module 44 in order that the user can select a candidate image from the plurality of images read into and displayed on the touch panel display module 44. Depending upon the setting, the control unit 41 may display default images over the whole screen instead of the thumbnail display.

Next, when a candidate image is selected by the user by touching it on the screen after displaying the thumbnail of images, the control unit 41 executes a display change (step S50) and then executes a one image display process (step S60) in which only the selected image is displayed over the whole screen.

The control unit 41 causes the touch panel display module 44 to display only the selected image over the whole screen. Then, when the touch panel input control module 47 detects a touch operation (refer to FIG. 6C) or a flick operation (refer to FIG. 6B) being performed on the touch panel input module 45, the control unit 41 executes, based on the result of the detection, an image selection operation process (step S70) based on a user operation.

The control unit 41 executes, as the image selection operation process (step S70), an operation determination (step S80) in which the control unit 41 determines which of the following operations has been operated; a flick operation to scroll the screen, an image selecting operation to change the print information of an image to be printed, a depressing operation to depress, for example, an icon displaying "Execute Printing" which is displayed on the touch panel display module 44 to denote the start of execution of printing of the selected image, or a depressing operation to depress, for example, an icon displaying "End" which is displayed on the touch panel display module 44 to denote that a power supply is switched off. It should be noted that the "Execute Printing" operation and the "End" operation also include keyboard operations using the print key and the power supply switch key 30 which are arranged on the keyboard 3 described before.

In the operation determination (step S80), when it is determined that the operation performed on the touch panel input module 45 by the user is a flick operation, the flow of the series of image grouping and screen scrolling operations proceeds to a flick operation process (step S100). Alternatively, when it is determined that the operation is an image selecting operation, the flow proceeds to an image selection operation process (step S130). When it is determined that the operation is an operation to instruct the start of printing, the flow proceeds to a print start process (step S90). Then, when it is determined that the operation performed on the touch panel input module 45 by the user is an operation to instruct the power supply to be switched off, the image grouping and screen scrolling process is ended.

In the flick operation process (step S100), as a flick direction determination process of determining the flick direction, firstly, the control unit 41 determines, as a direction determination module, the direction of the flick operation based on the information on touched position which is sequentially stored in the touched position storage domain 68 of the RAM 52.

Next, the control unit 41 executes, as the speed calculation module, a flick speed calculation process (step S110) in which an average flick speed is calculated based on the information on touched position which is sequentially stored in the touched position storage domain 68 of the RAM 52 and detection timing.

When detecting the flick operation and detecting the direction of the flick operation, the control unit 41 executes, based on the flick direction detected, an updating process (step S120) in which the display image on the touch panel display module 44 is changed fully by one image to the succeeding image or the preceding image to thereby update the image index. It should be noted that the updating process (step S120) will be described in detail later by using a sub-routine flow chart shown in FIG. 12.

Next, in order to display the image set in the updating process (step S120) on the touch panel display module 44, the control unit 41 executes a display updating process (step S140) and then the flow returns to the operation determination (step S80) where the next user operation is re-determined It should be noted that the display updating process (step S140) will be described in detail later by using a sub-routine flow chart shown in FIG. 13 which illustrates a process of changing the screen scrolling speed according to the group definition.

Additionally, in the operation determination (step S80), when it is determined that the operation performed on the touch panel input module 45 by the user is the image selecting operation, the control unit 41 executes the image selection operation process (step S130) in which the selected flag is updated to update the print information of the image to be printed for change in the number of pints to be made, for example. Then, when the image selection operation process (step S130) is completed, for example, the updated number of prints to be made is set as the number of prints to be made, and the control unit 41 executes the display updating process (step S140) to display the number of prints to be made together with the selected image in a corner of the display screen of the touch panel display module 44.

In addition, in the operation determination (step S80), when it is determined that the operation performed on the touch panel input module 45 by the user is the operation which instructs the execution of printing, the control unit 41 executes the print start process (step S90) based on the selection flag indicating the number of prints to be made of the previously set image and ends the process.

Figure 11:
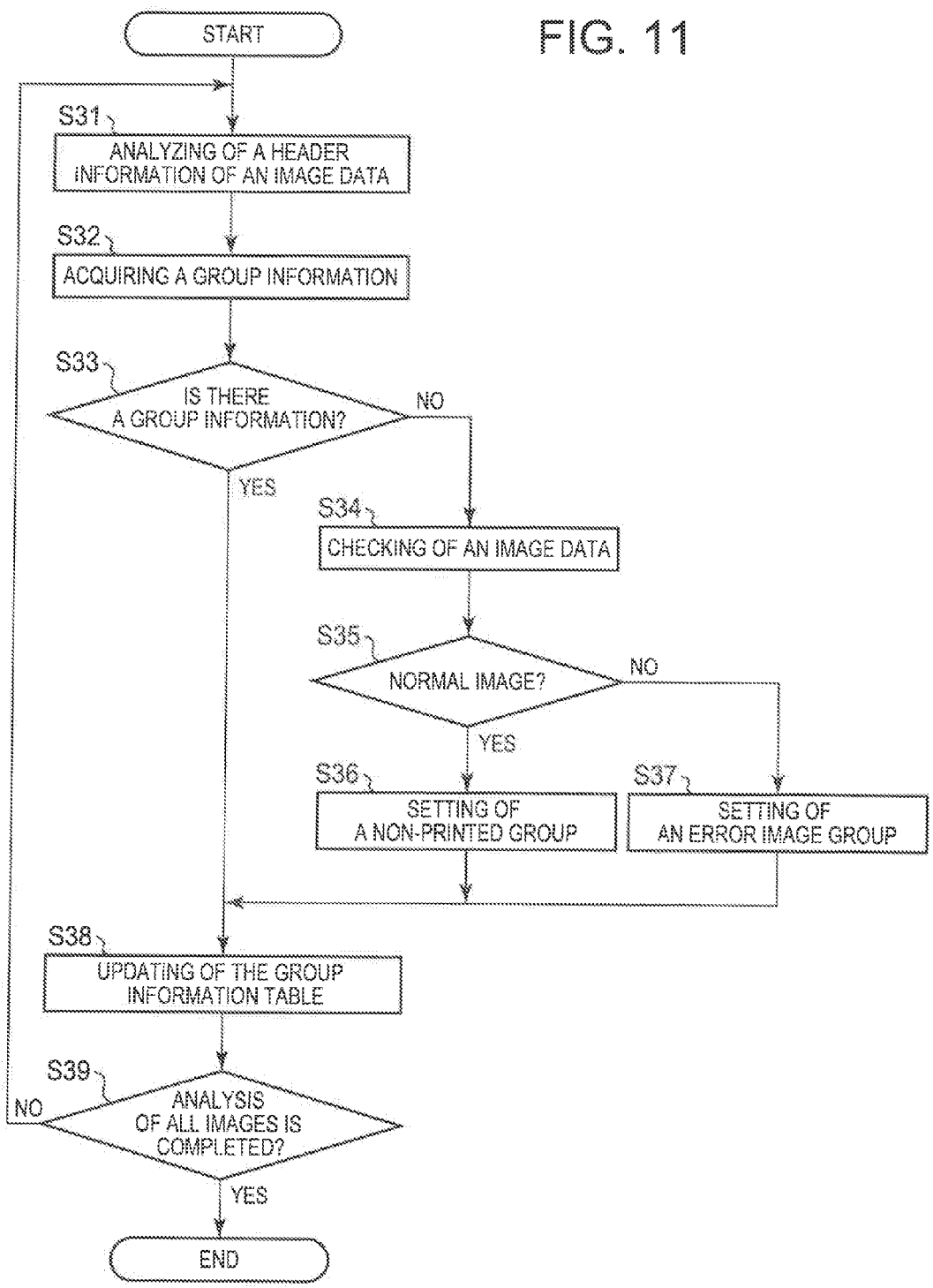
FIG. 11 is a flowchart in relation to an image determination process of determining an image performed on the image display unit having a touch panel according to the invention.

Here, the group definition determination process (step S30) will be described in detail by using the sub-routine flow chart shown in FIG. 11.

When reading the image information of all the images stored in the card medium therefrom via the I/O 54 and reading the image information of all the images stored in the storage medium of the main body, the control unit 41 executes a header analyzing process (step S31) in which the header information of the image data is analyzed.

Then, the control unit 41 executes a group information acquiring process (step S32) in which the header information of each image data is analyzed to thereby acquire the group information of the individual images one by one.

Next, the control unit 41 executes a group information determination (step S33) in which the group information of the individual images is acquired one by one for determination to thereby determine whether or not the images each contain the group information.

In the group information determination (step S33), the control unit 41 determines that the images contain the group information in the event that the control unit 41 determines that the images can be defined to fall under any of the group of non-printed images, the group of printed images and the group of favorite images of non-printed images and printed images which are set in advance to fall thereunder by the user, and then, the flow proceeds to a group information table updating process (step S38), which will be described later.

On the other hand, in the group information determination (step S33), when determining that the images do not belong to any of the group of non-printed images, the group of printed images and the group of favorite images, the control unit 41 determines that the images contain no group information, and the flow proceeds to an image data check process (step S34).

In the image data check process (step S34), the control unit 41 executes a normal image determination (step S35) on the images which contain no group information.

In the normal image determination (step S34), the group definition is not set to image data of images which are read from the card medium via the I/O 54 for the first time, and when the image data of the images read shows the normal picture size and the normal picture aspect ratio, the images are determined to be normal, and the flow proceeds to a non-printed group setting process (step S36).

Then, as the non-printed group setting process (step S36), the control unit 41 defines the images, to which the group definition is not set, as non-printed images in the header information thereof, and the flow proceeds to the group information table updating process (step S38).

In the normal image determination (step S35), when the image data of the images read shows an improper picture size and an improper picture aspect ratio, these images are determined to be error images, and the flow proceeds to an error image group definition setting process (step S37).

Then, as the error image group definition setting process (step S37), the control unit 41 defines those images as error images, and the flow proceeds to the group information table updating process (step S38).

As the group information table updating process (step S38), the control unit 41 defines the images read and writes group definitions according to the identifications of the images read in a group information table to update the group information table.

Next, the control unit 41 executes an all images analyzing process (step S39) in which whether or not all the images read acquire their own group information is determined.

In the all images analyzing determination (step S39), when the determination of or setting of the group information to all the images is completed, the sub-routine process of the group definition determination process (step S30) is ended. On the other hand, when the determination of or setting of the group information to all the images is not completed, the flow returns to the header analyzing process (step S31), where the remaining images are determined which group they belong to.

By doing so, the group information of all the images can be determined or set, whereby screen scrolling according to the group definition is enabled.

Figure 12:
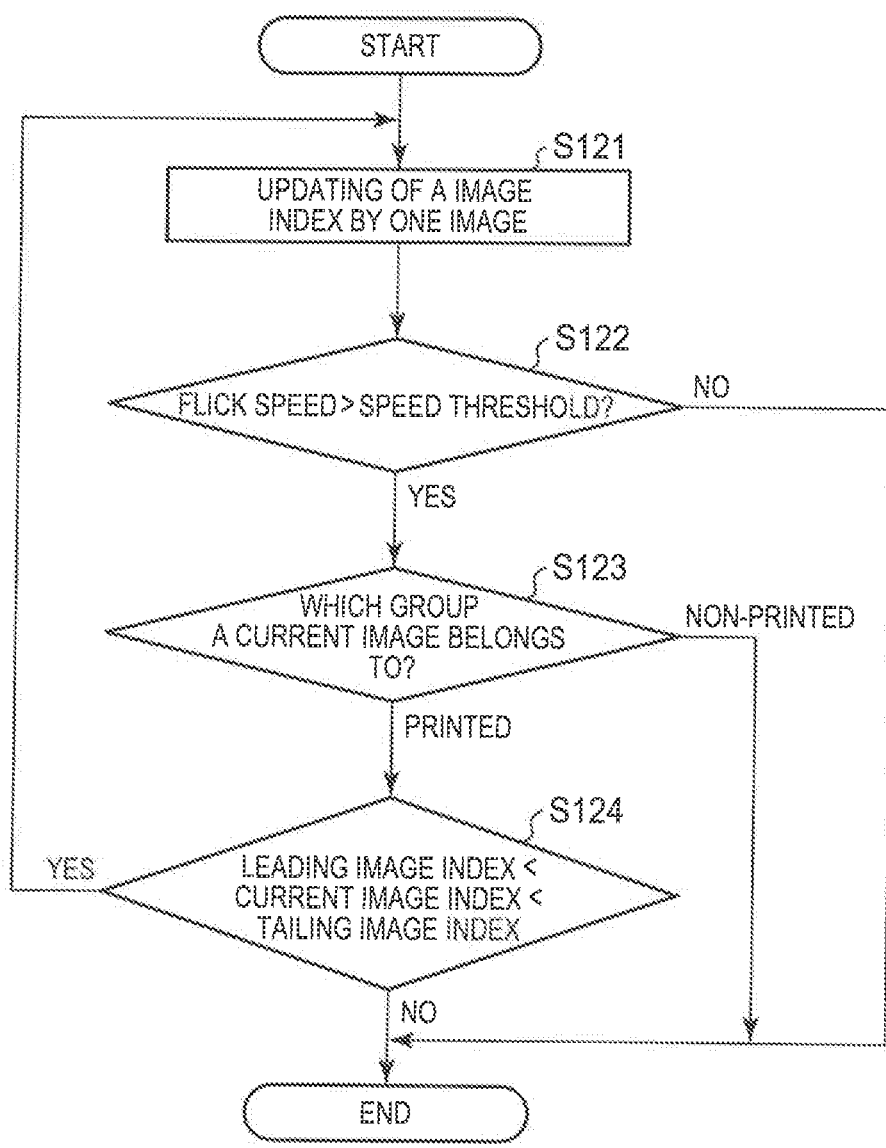
FIG. 12 is a flowchart in relation to an image index updating process performed on the image display unit having a touch panel according to the embodiment of the invention.

Here, the updating process (step S120) will be described in detail by using the sub-routine flowchart shown in FIG. 12 in which when the previously described flick operation is detected and the direction of the flick operation is also detected, the image index, which is the image information of an image that is displayed next on the touch panel display module 44, is changed to be updated for the succeeding image or the preceding image.

When detecting the flick operation and also detecting the direction of the flick operation, the control unit 41 executes an index updating process (step S121) in which the display image on the touch panel display module 44 is changed fully by one image to the succeeding image or the preceding image based on the direction of the flick operation detected to thereby update the image index.

Next, the control unit 41 executes a flick threshold determination (step S122) in which whether or not the flick speed previously calculated is faster than a predetermined flick speed threshold in the current flick operation is determined In the flick threshold determination (step S122), when the flick speed is slower than the flick threshold, the sub-routine process of the updating process (step S120) is ended. On the other hand, when the flick speed is faster than the flick threshold, in the event that an image (a second image) that is displayed next on the touch panel display module 44 is defined to fall, for example, under the group of printed images (the second predetermined group definition), the flow proceeds to a group definition determination (step S123) so as to update the image index.

In the group definition determination (step S123), when the group definition of the image (the second image) whose image index is updated is read from the head information thereof, if it is found out that the image is defined as a non-printed image (the second predetermined group definition) from the group definition read, the sub-routine process of the updating process (step S120) is ended. On the other hand, when the group definition of the image whose image index is updated defines the image as a printed image, the flow proceeds to an image index determination (step S124).

In the image index determination (step S124), in the event that the updated image index is a leading image index or a tailing image index of all the images read, the sub-routine process of the updating process (step S120) is ended. On the other hand, in the event that the updated image index is neither the leading image index nor the tailing image index, the flow returns to the index updating process (step S121), where the image index is updated so that the image information of the image which is displayed next on the touch panel display module 44 is used for the succeeding image or the preceding image.

In this way, in the event that the image index defines the image as the printed image, the next image index is read sequentially, whereas when the image index is read which defines the image as other than a printed image, the index updating process is ended and the flow returns to the image display process. Thus, images can be changed to be displayed by skipping the printed images.

By doing so, the group information of all the images is determined or set so as to update the image index of the printed image sequentially, whereby a quick screen scrolling can be realized by skipping the printed images as images to be displayed.

Here, the display updating process (step S140) will be described in detail by using a sub-routine flow chart shown in FIG. 13 in which scrolling speed is changed according to the group definition identified from the image information.

As the display updating process, the control unit 41 executes a group determination (step S141) in which the group definition of an image which corresponds to the image index updated in the updating process (step S120) which was described above is determined.

In the group determination (step S141), the group definition is read from the header information of the image corresponding to the updated image index, and when the image is defined as an error image by the group definition read, the flow proceeds to an error dummy image display process (step S142). When the image is defined as a printed-image, the flow proceeds to a 1-step display (step S143). When the image is defined as a printed image in the group of favorite images, the flow proceeds to a 5-step display (step S144). When the image is defined as a non-printed image, the flow proceeds to a 10-step display (step S145). Then, when the image is defined as a non-printed image in the group of favorite images, the flow proceeds to a 20-step display (step S146).

As the error dummy image display process (step S142), in the event that the image that is displayed next has an improper picture size and an improper picture aspect ratio and hence cannot be reproduced, the control unit 41 scrolls the screen quickly in one step which takes 0.1 second to scroll quickly the image which cannot be reproduced and displays an illustration image or characters on the touch panel display module 44 such as, for example, a dummy image of "?" or a message displaying "reproduction is impossible." Then, the flow returns to the operation determination (step S80), where which operations the user has performed is determined again.

In addition, as the 1-step display process (step S143) in which the printed images are displayed, the control unit 41 scrolls the screen quickly in one step which takes 0.1 second to scroll the displayed images quickly and displays the printed images deployed over the working area of the RAM 52 on the touch panel display module 44. Then, the flow returns to the operation determination (step S80), where which operations the user has performed is determined again.

Additionally, as the 5-step display process (step S144) in which the printed images set into the group of favorite images are displayed, the control unit 41 scrolls the screen in five steps which take 0.5 second to scroll the displayed images and displays the printed images set into the group of favorite images which are deployed over the working area of the RAM 52 on the touch panel display module 44. Then, the flow returns to the operation determination (step S80), where which operation the user has performed is determined again.

Further, as the 10-step display process (step S145) in which the non-printed images are displayed, the control unit 41 scrolls the screen in 10 steps which take one second to scroll the displayed images at slow speeds and displays the non-printed images which are deployed over the working area of the RAM 52 on the touch panel display module 44. Then, the flow returns to the operation determination (step S80), where which operation the user has performed is determined again.

Furthermore, as the 20-step display process (step s146) in which the non-printed images set into the group of favorite images are displayed, the control unit 41 scrolls the screen in 20 steps which take two seconds to scroll the displayed images and displays the non-printed images set into the group of favorite images which are deployed over the working area of the RAM 52 on the touch panel display module 44. Then, the flow returns to the operation determination (step S80), where which operation the user has performed is determined again.

Thus, according to the embodiment of the invention, it is possible to provide the image display unit, the image display method and the image display program in which in selecting a desired photographic image from a number of photographic images for printing, all the images read are grouped, and all the images read are sequentially viewed for verification from the table displaying all the images read by sequentially changing the screen scrolling speed according to the groups without adopting a hierarchical display of the images by group so as to select the desired image quickly and efficiently.

Further, according to the embodiment of the invention, the image changing speed is changed according to the flick speed, and therefore, it is possible to change images so quickly as to match the flick speed.

According to the embodiment of the invention, when selecting a new print image, the screen is scrolled so as to skip the images which have been printed before, whereby it becomes possible to sequentially scroll the screen for images which are highly possible to be printed.

In addition, according to the embodiment of the invention, by determining which of the following groups the image selected for printing falls under; the group of favorite images of printed images and non-printed images, the group of non-printed images, the group of printed images and the group of error images, it is possible to scroll slowly images which are highly possible to be printed for verification while scrolling quickly images which are low in possibility to be printed.

Further, according to the embodiment of the invention, in particular, images which are printed highly frequently and images which are periodically used in relation to annual events are grouped into the group of favorite images, and therefore, it is possible to scroll slowly the images which are highly possible to be printed for verification.

Then, according to the embodiment of the invention, once non-printed images are printed, the images so printed are then defined to fall under the group of printed images, whereby it is possible to scroll them quickly as images which are low in possibility to be printed.

In the embodiment described heretofore, while the desired image is allowed to be selected quickly by skipping the printed images, the group definition (the second predetermined group definition) of images to be skipped is not limited to the printed images.

Additionally, the various processes described in the embodiment can be written on a storage medium in the form of, for example, a magnetic disk, an optical disk or a semiconductor memory as an image display program which can be realized in a computer for application to various systems or can be transmitted to the various systems by a communication medium for application thereto. In this way, by executing the image printing program for executing the various processes described in this embodiment in other electronic equipment, the same function and advantage as those obtained when the image display unit 1 is used can be obtained. It should be noted that the computer is not limited to the computer incorporated in the image display unit 1 and hence includes every computer which is built in electronic equipment which includes an arithmetic operation unit such as a CPU that can read the image display program described above and which performs controlling operations according to the program so read.

While the several embodiments of the invention have been described heretofore, these embodiments are proposed as the examples, and hence, there is no intention to limit the scope of the invention by those embodiments. These novel embodiments can be carried out in other various forms, and it is possible to make various omissions, replacements or alterations thereto without departing from the spirit and scope of the invention. These resulting embodiments and their modifications are included in the spirit and scope of the invention and the scope of inventions which will be claimed later and their equivalents.

What is claimed is:

1. An image display unit comprising:
   an image display module configured to switch an image displayed among a plurality of images each having image information and header information;
   a touch panel input module having an input area which receives inputs;
   an image reading module configured to read the image information of each of the plurality of images and the header information of each of the plurality of images;
   a group definition determination module configured to determine, based on the header information of a first image among the plurality of images which is to be displayed next in response to an operation performed on the touch panel input module, whether a group definition included in the header information of the first image indicates that the first image is one of a non-printed or printed favorite image, a non-printed image which is not a favorite image, an error image, and a printed image which is not a favorite image and has been already printed;
   a speed derivation module configured to derive a speed of a shift operation which is performed on the touch panel input module, the shift operation comprising an operation in which a touched position on the touch panel input module is shifted after a touch operation thereon is begun;
   a skip changing module configured to skip the first image when a comparison of the shift speed obtained by the speed derivation module with a speed threshold indicates that the shift speed is faster than the speed threshold and the group definition determination module determines that the group definition of the first image indicates that the first image is a printed image which is not a favorite image and has already been printed; and
   an image changing module configured to switch to the first image with a first duration specific to a first given group definition when the group definition determination module determines that the group definition of the first image indicates that the first image is a first one of a printed favorite image, a non-printed image which is not a favorite image, and a non-printed favorite image, and configured to switch to the first image with a second duration specific to a second given group definition when the group definition determination module determines that the group definition of the first image indicates that the first image is second one, which is different from the first one, of a printed favorite image, a non-printed image which is not a favorite image, and a non-printed favorite image, the second duration being different from the first duration.

2. The image display unit according to claim 1, wherein after the skip changing module skips the first image, the group definition determination module reads the image information and the header information of a second image which is to be displayed next after the first image in response to the shift operation to determine whether or not a group definition contained in the header information of the second image indicates that the second image is a printed image which is not a favorite image and has already been printed, and
   wherein after the skip changing module skips the first image, the skip changing module skips the second image when the group definition determination module determines that the group definition of the second image indicates that the second image is a printed image which is not a favorite image and has already been printed, whereas the skip changing module displays the second image on the image display module when the group definition determination module determines that the group definition of the second image does not indicate that the second image is a printed image which is not a favorite image and has already been printed.

3. The image display unit according to claim 1, wherein the image changing module is configured to switch to the first image with the first duration specific to the first given group definition when the group definition determination module determines that the group definition of the first image indicates that the first image is a non-printed favorite image, and is configured to switch to the first image with the second duration specific to the second given group definition when the group definition determination module determines that the group definition of the first image indicates that the first image is a non-printed image which is not a favorite image, the second duration being shorter than the first duration.

4. An image display method comprising:
   changing display of a plurality of images each having image information and header information;
   reading the image information of each of the plurality of images and the header information of the plurality of images;
   determining, based on the header information of a first image of the plurality of images that is to be displayed next in response to an operation performed on a touch panel input module having an input area which receives inputs, whether a group definition included in the header information of the first image indicates that the first image is one of a non-printed or printed favorite image, a non-printed image which is not a favorite image, an error image, and a printed image which is not a favorite image and has already been printed;
   calculating a speed of a shift operation which is performed on the touch panel input module, the shift operation comprising an operation in which a touched position on the touch panel input module is shifted after a touch operation thereon is begun;
   skipping the first image when a comparison of the calculated shift speed with a speed threshold indicates that the shift speed is faster than the speed threshold and it is determined that the group definition of the first image indicates that the first image is a printed image which is not a favorite image and has already been printed; and
   switching to the first image with a first duration specific to a first given group definition when it is determined that the group definition of the first image indicates that the first image is a first one of a printed favorite image, a non-printed image which is not a favorite image, and a non-printed favorite image, and switching to the first image with a second duration specific to a second given group definition when it is determined that the group definition of the first image indicates that the first image is second one, which is different from the first one, of a printed favorite image, a non-printed image which is not a favorite image, and a non-printed favorite image, the second duration being different from the first duration.

5. The image display method according to claim 4, wherein the switching includes switching to the first image with the first duration specific to the first given group definition when it is determined that the group definition of the first image indicates that the first image is a non-printed favorite image, and switching to the first image with the second duration specific to the second given group definition when it is determined that the group definition of the first image indicates that the first image is a non-printed image which is not a favorite image, the second duration being shorter than the first duration.

6. A non-transitory computer readable recording medium which stores an image display program for causing a computer to realize an image display method in an image display unit including an image display module configured to change display of a plurality of images each having image information and header information, and a touch panel input module having an input area which receives inputs, the image display program being configured to cause the computer to execute functions comprising:

changing the display of the plurality of images;

reading the image information of each of the plurality of images and the header information of the plurality of images;

determining, based on the header information of a first image of the plurality of images that is to be displayed next in response to an operation performed on the touch panel input module, whether or not a group definition included in the header information of the first image indicates that the first image is one of a non-printed or printed favorite image, a non-printed image which is not a favorite image, an error image, and a printed image which is not a favorite image and has been already printed;

calculating a speed of a shift operation which is performed on the touch panel input module, the shift operation comprising an operation in which a touched position on the touch panel input module is shifted after a touch operation thereon is begun;

skipping the first image when a comparison of the calculated shift speed with a speed threshold indicates that the shift speed is faster than the speed threshold and it is determined that the group definition of the first image indicates that the first image is a printed image which is not a favorite image and has already been printed; and switching to the first image with a first duration specific to a first given group definition when it is determined that the group definition of the first image indicates that the first image is a first one of a printed favorite image, a non-printed image which is not a favorite image, and a non-printed favorite image, and switching to the first image with a second duration specific to a second given group definition when it is determined that the group definition of the first image indicates that the first image is second one, which is different from the first one, of a printed favorite image, a non-printed image which is not a favorite image, and a non-printed favorite image, the second duration being different from the first duration.

7. The non-transitory computer readable recording medium according to claim 6, wherein the switching includes switching with the first image for the first duration specific to the first given group definition when it is determined that the group definition of the first image indicates that the first image is a non-printed favorite image, and switching to the first image with the second duration specific to the second given group definition when it is determined that the group definition of the first image indicates that the first image is a non-printed image which is not a favorite image, the second duration being shorter than the first duration.

* * * * *